Patented July 21, 1942

2,290,294

UNITED STATES PATENT OFFICE 2,290,294

PROCESS OF TANNING HIDES AND SKINS

Carl Riess, Ludwigshafen-on-the-Rhine, and Rudolf Watzel, Mannheim, Germany, assignors to Chemische Fabrik Joh. A. Benckiser G. m. b. H., Ludwigshafen-on-the-Rhine, Germany, a corporation of Germany No Drawing. Application April 19, 1940, Serial No. 330,560. In Germany April 15, 1939

21 Claims. (Cl. 149—5)

This invention relates generally to the tanning of hides, kips, skins, and other organic substances containing collagen, and is more particularly directed to compositions and processes for tanning, wherein a reaction product of molecularly dehydrated polymeric phosphoric acids and aromatic hydroxycompounds is employed, the latter having before been reacted with nucleus-binding agents.

It is well known to use in the tanning of leathers and furs molecularly dehydrated polymeric phosphoric acids and their salts for tanning, pretanning or retanning.

We have found that superior tanning effects can be obtained, when using reaction products of molecularly dehydrated polymeric phosphoric acids with aromatic hydroxycompounds, the latter having before been reacted with nucleus-binding substances, such as sulphuric acid and/or aldehydes.

Among the suitable aromatic hydroxycompounds those of first importance are: phenols, cresols, naphthols, their substitution products, and analogous compounds. These agents are first reacted with nucleus-binding substances, such as sulphuric acid, chlorosulphonic acid, aldehydes, or mixtures thereof, processes from which result as intermediary compositions polynuclear, not condensed systems, linked to each other by $SO_2$, $CH_2$ or analogous groups, such as dihydroxy-diphenyl-sulphone, dihydroxy-dinaphthyl-sulphone, dihydroxy-diphenyl-methane.

The process of the present invention begins with the preparation of the polynuclear aromatic hydroxycompounds by heating the hydroxycompounds, for example phenols, with nucleus-binding substances, for example sulphuric acid or formaldehyde, and dressing in known manner. The resulting products are now brought to reaction with molecularly anhydrous polymeric phosphoric acid, both components having before been heated to 200 or 300° C. Molecularly anhydrous or dehydrated polymeric phosphoric acids include all polymeric phosphoric acids containing a lesser quantity of molecularly bound water than orthophosphoric acid. Among such acids, those of first importance are pyrophosphoric acid and the different polymeric metaphosphoric acids, such as di-, tri-, tetra-, hexa-, meta-phosphoric acids, etc. of the general formula $(HPO_3)_n$. Such molecularly anhydrous polymeric phosphoric acids also include other so-called polymeric phosphoric acids, such as polymeric triphosphoric acid, polymeric tetraphosphoric acid, etc. (See Gmelin Handbuch der Anorganischen Chemie, 8th edition, volume 21, pp. 918–925.)

The tanning effect of the new products is considerably superior to that of simple anhydrous polymeric phosphoric acids or their salts. In comparison with other synthetic tanning substances of high molecular weight they have the advantage of being very stable and nearly odourless, and of being easily water-soluble in any concentration.

*Example 1.*—250 g. of the reaction product formed by heating 2 gram-molecules of phenol and 1 gram-molecule of sulphuric acid to temperatures beyond 100° C. and consisting in the main part of hydroxy-diphenyl-sulphone are heated with 200 g. of anhydrous phosphoric acid (87% $P_2O_5$) until complete melting at 240 or 260° C. After cooling, the red-brown, viscous mass is neutralized.

*Example 2.*—200 g. of the product of condensation of 2 gram-molecules of phenol and 1 gram-molecule of formaldehyde, consisting in the main part of hydroxy-diphenyl-methane, are molten with 200 g. of anhydrous phosphoric acid as in Example 1, and neutralized after cooling.

A particular form of execution of the present process is to react with formaldehyde the products formed by reaction of anhydrous polymeric phosphoric acid with aromatic hydroxycompounds. By this step a further condensation or polymerization, still increasing and intensifying the tanning effect of the present products, is supposed to take place.

*Example 3.*—To the product prepared according to Example 1 or 2 are added after cooling, but before neutralizing, 40 to 50 g. of 40%-formaldehyde solution. The mass is then heated until disappearance of the formaldehyde odour, cooled, and neutralized. The products thus prepared have higher tanning qualities than those according to Example 1 or 2.

What we claim is:

1. In a process of tanning hides, skins and the like, the step comprising subjecting the material to a tanning solution containing a product formed by reaction of molecularly dehydrated polymeric phosphoric acid with a product of the condensation of aromatic hydroxycompounds and nucleus-binding agents.

2. In a process of tanning hides, skins and the like, the step comprising subjecting the material to a tanning solution containing a product formed by the reaction of molecularly dehydrated polymeric phosphoric acid with a product of condensation of aromatic hydroxycompounds and nucleus-binding agents, wherein the first obtained reaction product is further condensed with formaldehyde.

3. The process of preparing agents for tanning comprising reacting at an elevated temperature a molecularly dehydrated polymeric phosphoric acid with a poly-(hydroxy-aromatic) compound, the hydroxyaromatic nuclei of which are joined through an atomic bridge, said poly-(hydroxyaromatic) compound being derived by condensing a hydroxyaromatic compound with a nucleus-binding agent.

4. The process of preparing agents for tanning comprising reacting at an elevated temperature a molecularly dehydrated polymeric phosphoric acid with a poly-(hydroxy-aromatic) compound the hydroxyaromatic nuclei of which are joined through an atomic bridge, said poly-(hydroxyaromatic) compound being derived by condensing a hydroxyaromatic compound with a sulfuric acid nucleus-binding agent.

5. The process of preparing agents for tanning comprising reacting at an elevated temperature a molecularly dehydrated polymeric phosphoric acid with a poly-(hydroxy-aromatic) compound the hydroxyaromatic nuclei of which are joined through an atomic bridge, said poly-(hydroxyaromatic) compound being derived by condensing a hydroxyaromatic compound with an aldehyde nucleus-binding agent.

6. The process of preparing agents for tanning comprising reacting at an elevated temperature a molecularly dehydrated polymeric phosphoric acid with a poly-(hydroxyphenol) compound the hydroxyphenol nuclei of which are joined through an atomic bridge, said poly-(hydroxyphenyl) compound being derived by condensing a hydroxyphenyl compound with a nucleus-binding agent.

7. The process of preparing agents for tanning comprising reacting at an elevated temperature a molecularly dehydrated polymeric phosphoric acid containing approximately 87% $P_2O_5$ with a poly-(hydroxyphenyl) compound the hydroxyphenyl nuclei of which are joined through an atomic bridge, said poly-(hydroxyphenyl) compound being derived by condensing a hydroxyphenyl compound with a nucleus-binding agent.

8. The process of preparing agents for tanning comprising reacting at an elevated temperature a molecularly dehydrated polymeric phosphoric acid with a poly-(hydroxyphenyl) compound the hydroxyphenyl nuclei of which are joined through an atomic bridge, said poly-(hydroxyphenyl) compound being derived by condensing a hydroxyphenyl compound with a formaldehyde nucleus-binding agent.

9. The process of preparing agents for tanning comprising reacting at an elevated temperature a molecularly dehydrated polymeric phosphoric acid containing approximately 87% $P_2O_5$ with a poly-(hydroxyphenyl) compound the hydroxyphenyl nuclei of which are joined through an atomic bridge, said poly-(hydroxyphenyl) compound being derived by condensing a hydroxyphenyl compound with a sulfuric acid nucleus-binding agent.

10. The process of preparing agents for tanning comprising reacting at an elevated temperature a molecularly dehydrated polymeric phosphoric acid with a poly-(hydroxyaromatic) compound the hydroxyaromatic nuclei of which are joined through an atomic bridge, said poly-(hydroxyaromatic) compound being derived by condensing a hydroxyaromatic compound with a nucleus-binding agent and further condensing the molecularly dehydrated polymeric phosphoric acid reaction product with formaldehyde.

11. The process of preparing agents for tanning comprising reacting at an elevated temperature a molecularly dehydrated polymeric phosphoric acid containing approximately 87% $P_2O_5$ with a poly-(hydroxyphenyl) compound the hyroxyphenyl nuclei of which are joined through an atomic bridge, said poly-(hydroxyphenyl) compound being derived by condensing a hydroxyphenyl compound with a formaldehyde nucleus-binding agent and further condensing the molecularly dehydrated polymeric phosphoric acid reaction product with formaldehyde.

12. The process of preparing agents for tanning comprising reacting at an elevated temperature a molecularly dehydrated polymeric phosphoric acid with a poly-(hydroxyphenyl) compound the hydroxyphenyl nuclei of which are joined through an atomic bridge, said poly-(hydroxyphenyl) compound being derived by condensing a hydroxyphenyl compound with a sulfuric acid nucleus-binding agent and further condensing the molecularly dehydrated polymeric phosphoric acid reaction product with formaldehyde.

13. A tanning compound containing the reaction product of claim 3.

14. A tanning compound containing the reaction product of claim 6.

15. A tanning compound containing the reaction product of claim 7.

16. A tanning compound containing the reaction product of claim 8.

17. A tanning compound containing the reaction product of claim 9.

18. A new tanning agent, the reaction product of claim 10.

19. A new tanning agent, the reaction product of claim 11.

20. A new tanning agent, the reaction product of claim 12.

21. A tanning agent comprising the product obtained by reacting dehydrated polymeric phosphoric acid with the condensation product of a phenol and a sulfuric acid nucleus-binding agent wherein the first obtained reaction product is further condensed with formaldehyde.

CARL RIESS.
RUDOLF WATZEL.